(12) United States Patent
Kadoya et al.

(10) Patent No.: US 9,434,021 B2
(45) Date of Patent: Sep. 6, 2016

(54) CAPACITIVE WELDER AND METHOD FOR CHARGING SAME

(71) Applicant: ORIGIN ELECTRIC COMPANY, LIMITED, Saitama-shi, Saitama (JP)

(72) Inventors: Yasuo Kadoya, Saitama (JP); Kouji Arai, Saitama (JP); Akio Komatsu, Saitama (JP)

(73) Assignee: ORIGIN ELECTRIC COMPANY, LIMITED, Saitama-shi, Saitama (JP)

( * ) Notice: Subject to any disclaimer, the term of this patent is extended or adjusted under 35 U.S.C. 154(b) by 219 days.

(21) Appl. No.: 14/371,403

(22) PCT Filed: Jan. 10, 2013

(86) PCT No.: PCT/JP2013/050294
§ 371 (c)(1),
(2) Date: Jul. 9, 2014

(87) PCT Pub. No.: WO2013/105596
PCT Pub. Date: Jul. 18, 2013

(65) Prior Publication Data
US 2015/0015212 A1    Jan. 15, 2015

(30) Foreign Application Priority Data

Jan. 12, 2012    (JP) .................................. 2012-004194

(51) Int. Cl.
| | |
|---|---|
| *H01M 10/44* | (2006.01) |
| *H01M 10/46* | (2006.01) |
| *B23K 11/26* | (2006.01) |
| *B23K 11/24* | (2006.01) |
| *H02J 7/00* | (2006.01) |
| *H02J 7/34* | (2006.01) |

(52) U.S. Cl.
CPC ................ *B23K 11/26* (2013.01); *B23K 11/24* (2013.01); *H02J 7/0052* (2013.01); *H02J 7/345* (2013.01)

(58) Field of Classification Search
CPC .......... H02J 7/025; H02J 7/345; H02J 5/005; B23K 3/0475; B23K 11/26; B23K 11/248
USPC ............. 320/107, 108, 166; 219/85.16, 91.2, 219/112, 113
See application file for complete search history.

(56) References Cited

U.S. PATENT DOCUMENTS

| | | | | |
|---|---|---|---|---|
| 3,651,341 | A | * | 3/1972 | Shano ................... F02P 3/0884 123/598 |
| 2014/0374389 | A1 | * | 12/2014 | Arai ....................... B23K 11/26 219/113 |

FOREIGN PATENT DOCUMENTS

JP    10-216957 A    8/1998

OTHER PUBLICATIONS

PCT/JP2013/050294 International Search Report dated Apr. 16, 2013 (One (1) page).

*Primary Examiner* — Edward Tso
(74) *Attorney, Agent, or Firm* — Crowell & Moring LLP

(57) ABSTRACT

The capacitive welder includes a charging circuit, a welding transformer, a capacitor, a discharging switching element connected in parallel with a primary winding of the welding transformer and the capacitor that are connected in series, a bypass switching element connected in parallel with the primary winding, welding electrodes connected in parallel with a secondary winding of the welding transformer, and a control circuit for bringing the welding transformer into a reset allowing state by allowing a reset current to flow in the primary winding using the input power introduced through the charging circuit without supplying an ON signal to the bypass switching element, and then supplying the ON signal to the bypass switching element such that the capacitor is charged through the bypass switching element by the input power introduced through the charging circuit.

15 Claims, 2 Drawing Sheets

CAPACITIVE WELDER AND METHOD FOR CHARGING SAME

TECHNICAL FIELD

The present invention relates to a capacitive welder for welding an object to be welded, and also relates to a method of charging the capacitive welder.

BACKGROUND ART

A capacitive welder is advantageous in that the capacitive welder does not need a large facility for receiving electric power, if compared to a general AC welder, because the capacitive welder stores welding electric power in a welding capacitor in a longer time than a discharge time and discharges the electricity at once. The capacitive welder is also advantageous in that welding marks (burning) are hardly created at welded portions and distortions are small because the object to be welded is only superheated to a small extent. Because of such advantages, the capacitive welder is employed for any size of industrial facility (from small to large industrial facilities).

In general, the capacitive welder uses a capacitor bank as a welding capacitor, which includes a plurality of parallel-connected capacitors. Because the resistance welding method using the capacitive welder is well known, the resistance welding method is not described here in detail. In brief, the welding capacitor is charged by a charging circuit, and the charging circuit is turned off when the charging voltage of the welding capacitor increases to a predetermined value (e.g., about 450V). Then, a discharge switch is turned on to allow a steeply increasing pulse current to flow to a primary winding of a welding transformer. A pulse welding current, which is significantly greater than the primary winding current, flows to a secondary winding of the welding transformer. This welding current flows in the object to be welded, through welding electrodes and therefore the object is welded.

LISTING OF REFERENCE(S)

Patent Literature(S)

PATENT LITERATURE 1: Japanese Patent Application Laid-Open Publication No. Hei 10-216957

SUMMARY OF THE INVENTION

Problems to be Solved

In the capacitive welder, the capacitor discharge for welding usually takes place in the same direction every time, in order not to change the welding property due to the direction of the current. However, if the current flows in the welding transformer in one direction only, bias magnetism occurs and the output of the welding transformer drops. To avoid this, the current during charging is caused to flow in the welding transformer in a direction opposite the current during discharging to perform the magnetic resetting for elimination of the bias magnetism. However, the welding transformer possesses a large inductance and therefore the charging current of the capacitor that flows through the welding transformer is suppressed. This results in a problem that a long time is needed to complete the charging.

To address this problem in the conventional art, as shown in FIG. 9 of Patent Literature 1, a bypass circuit 12 including a resistor 13 and a diode 14 is connected in parallel with a primary side of a welding transformer 8 to reduce the influence of the inductance of the welding transformer 8 and ensure a necessary amount of charging current Ia. This approach, however, has a problem in that a sufficient reset current that is necessary to magnetically reset the welding transformer 8 and should flow in the primary winding of the welding transformer 8 is not obtained because the charging current Ia is divided to a flow to the bypass circuit 12 having a low (lower) impedance and another flow to the primary winding of the welding transformer 8 having a large (larger) impedance. With this approach, therefore, the welding transformer 8 is used in the biased magnetism condition. If the impedance of the bypass circuit 12 is low, most of the charging current flows to the bypass circuit. To avoid this, a relatively large resistor 13 should be connected such that the impedance of the bypass circuit 12 become large. This wastefully consumes the electricity at the bypass circuit 12 and delays the charging time.

To overcome the above-described problems, the capacitive welder disclosed in Patent Literature 1 includes a switching element 26 and a feedback diode 27, both connected between a discharge circuit 28 connected to cause the charging current to flow through the welding transformer 8, and a rectifying/smoothing circuit 22 for converting the AC voltage to the DC voltage. This capacitive welder also includes a main control unit 37 to turn on the switching element and feedback diode when a frequency higher than a commercial frequency is applied, and turn off the switching element and feedback diode when a predetermined current value is reached. This configuration allows the charging current to continuously flow, with its peak value being the predetermined current value. The capacitive welder of Patent Literature 1 firstly charges the capacitor 24 with the electric power introduced from the input terminals 1, and then the DC voltage of the capacitor 24 is used to charge the welding capacitor 7. Thus, when the welding capacitor 7 having a large capacity is used, the capacitor 24 should also have a large capacity. This increases the size and cost of the welder.

In order to address these problems, an object of the present invention is to provide a capacitive welder that can sufficiently reset the magnetism of a welding transformer and quickly charge a welding capacitor, and to provide a method of charging the capacitive welder.

Solution to the Problem

In order to achieve the above-mentioned object, when the welding capacitor is charged, the capacitive welder and the charging method for the capacitive welder according to the present invention cause the reset current to flow in the primary winding of the welding transformer and then charge the welding capacitor via the bypass switching element.

Specifically, the capacitive welder according to one aspect of the embodiments includes a charging circuit having a switching element, a welding transformer having a primary winding and a secondary winding, a capacitor to which an input electric power is introduced via the charging circuit, a discharge switching element connected in parallel with the primary winding and the capacitor, the primary winding being connected in series to the capacitor, a bypass switching element connected in parallel with the primary winding, welding electrodes connected in parallel with the secondary winding of the welding transformer, and a control circuit configured to bring the welding transformer into a reset allowing state by causing a reset current to flow in the primary winding using the input electric power introduced through the charging circuit without supplying (sending) an ON signal to the bypass switching element, and then supply the ON signal to the bypass switching element such that the capacitor is charged via the bypass switching element by the input electric power introduced through the charging circuit.

A capacitive welder charging method according to another aspect of the embodiments is a method of charging a capacitive welder that includes a charging circuit having a switching element, a welding transformer having a primary winding and a secondary winding, a capacitor to which an input electric power is introduced via the charging circuit, a discharge switching element connected in parallel with the primary winding and the capacitor, the primary winding being connected in series to the capacitor, a bypass switching element connected in parallel with the primary winding, and welding electrodes connected in parallel with the secondary winding of the welding transformer. The capacitive welder charging method includes bringing the welding transformer into a reset allowing state by causing a reset current to flow in the primary winding using the input electric power introduced through the charging circuit without supplying an ON signal to the bypass switching element, and then supplying the ON signal to the bypass switching element such that the capacitor is charged via the bypass switching element by the input electric power introduced through the charging circuit.

When the welding transformer is brought into the reset allowing state and the current starts flowing in the bypass switching element from the charging circuit, the control circuit of the capacitive welder according to another aspect of the embodiments may control the switching element in the charging circuit such that the bypass switching element is brought into a conduction state with a shorter on-time width (a shorter conduction time) than a maximum on-time width of when the current flows in the primary winding of the welding transformer before the switching element of the charging circuit is brought into the reset allowing state.

When the voltage of the capacitor that is charged with the current flowing through the primary winding becomes equal to or greater than a predetermined voltage for reset determination, when the current flowing through the primary winding becomes equal to or greater than a predetermined current for reset determination, when the differential voltage between the voltage of the capacitor and a previous voltage of the capacitor becomes equal to or greater than the predetermined voltage for reset determination, when the differential current between the current flowing through the primary winding and a previous current flowing through the primary winding becomes equal to or greater than the predetermined current for reset determination, or when a predetermined time elapses since the current starts flowing through the primary winding, then the control circuit of the capacitive welder according to yet another aspect of the embodiments may determine that the welding transformer is in the reset allowing state and supply the on-signal to the bypass switching element.

Advantageous Effects of the Invention

The present invention provides a capacitive welder that can sufficiently reset the magnetism of the welding transformer and quickly charge the welding capacitor, and provides a charging method for such capacitive welder.

DESCRIPTION OF EMBODIMENTS

Figure 1:
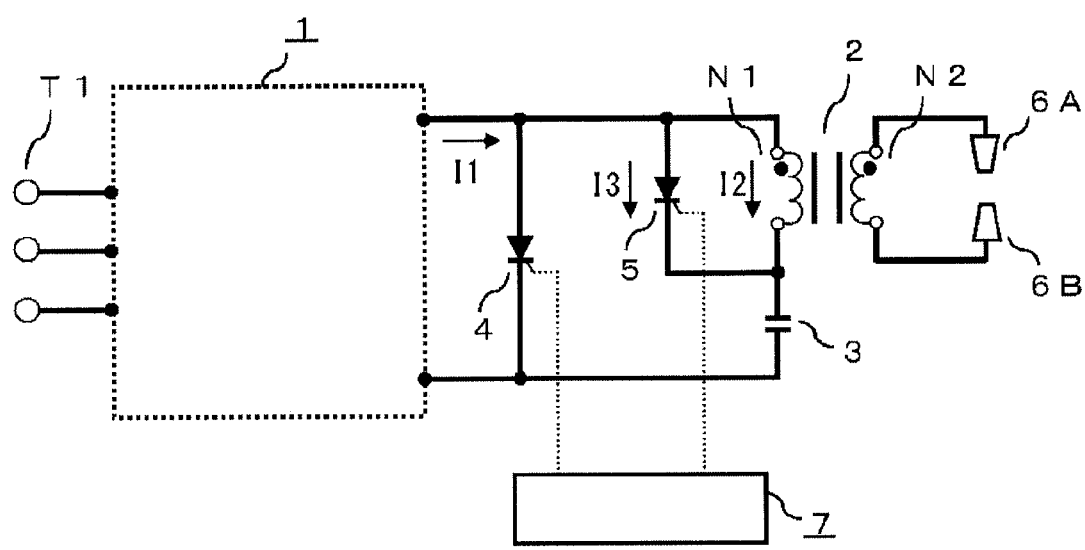
FIG. 1 is a block diagram useful to describe a capacitive welder according to one embodiment of the present invention.

An embodiment of the present invention will be described with reference to the accompanying drawings. The embodiment to be described below is an example, and the present invention is not limited to the below-described embodiments. In this specification and the drawings, components and elements having the same reference numerals and symbols indicate the same components and elements.

First Embodiment

FIG. 1 illustrates a block diagram to describe a capacitive welder of this embodiment. The capacitive welder includes a charging circuit 1 having a switching element (not shown), a welding transformer 2 having a primary winding N1 and a secondary winding N2, a capacitor 3 to which an input electric power from input terminals T1 is introduced via the charging circuit 1, a discharge switching element 4 connected in parallel with the primary winding N1 and the capacitor 3 that are connected in series with each other, a bypass switching element 5 connected in parallel with the primary winding N1, welding electrodes 6A and 6B connected in parallel with the secondary winding N2 of the welding transformer 2, and a control circuit 7 configured to bring the welding transformer 2 into a reset allowing state by causing a reset current to flow into the primary winding N1 using the input electric power introduced through the charging circuit 1 without supplying an ON signal to the bypass switching element 5, and then supply the ON signal to the bypass switching element 5 such that the capacitor 3 is charged via the bypass switching element 5 by the input electric power introduced through the charging circuit 1.

The charging circuit 1 is a circuit configured to charge the capacitor 3. No particular limitations are imposed on the circuit structure of the capacitor 3 except for possession of the switching element. Although the detail circuitry of the charging circuit 1 is not shown, some exemplary circuitries will be described briefly. An input power source externally connected to the input terminals T1 may be a single-phase or three-phase commercial AC power source or a generator. If the input power source is a single-phase AC power supply, the charging circuit 1 may include a single-phase bridge rectifier circuit (single-phase full wave rectifier circuit), which has rectifier diodes connected in a bridge structure, and a semiconductor switch such as thyristor connected in series to a DC output of the single-phase full wave rectifier (bridge rectifier) circuit so that the charging circuit has an opening/shutting function, or alternatively, the charging circuit 1 may be a single-phase hybrid bridge full wave (asymmetric half-controlled bridge; hybrid bridge) rectifier circuit, which has rectifier diodes and thyristors connected in a bridge structure, so that the single-phase hybrid bridge full wave rectifier circuit has an opening/shutting function. If the input power source is a three-phase AC power supply, the charging circuit 1 may include a three-phase full wave rectifier circuit, which has rectifier diodes connected in a three-phase bridge structure, and a semiconductor switch connected in series to a DC output of the three-phase full wave rectifier circuit so that the charging circuit has an opening/shutting function, or alternatively, the charging circuit 1 may be a three-phase hybrid bridge full wave rectifier circuit, which has rectifier diodes and thyristors connected in a three-phase bridge structure, so that the three-phase hybrid bridge full wave rectifier circuit has an opening/shutting function.

The welding transformer 2 has a secondary winding N2, which has, for example, one turn or the like, and a primary winding N1 which has greater turns than the secondary winding N2. Welding electrodes 6A and 6B are connected in parallel with the secondary winding N2 of the welding transformer 2. An object to be welded is clamped between the welding electrodes 6A and 6B, a discharge current from the charged capacitor 3 flows in the primary winding N1 of the welding transformer 2, and a corresponding current, which is decided based on the ratio of the turn(s) of the secondary winding N2 to the turns of the primary winding N1, flows via the secondary winding N2 into the object to be welded, clamped between the welding electrodes 6A and 6B, so that the welding is carried out on the object.

The capacitor 3 is connected in series to the primary winding N1, and the series circuit constituted by the primary winding N1 and the capacitor 3 is connected across both ends of the charging circuit 1. The capacitor 3 may be a capacitor block, which has a plurality of polarized electrolytic capacitors connected in parallel, or a capacitor bank, which includes a plurality of capacitor blocks connected in parallel. Alternatively, the capacitor 3 may be a capacitor block, which has a plurality of non-polar (bipolar) capacitors, such as polypropylene film capacitors, connected in parallel, or a capacitor bank, which includes a plurality of such capacitor blocks connected in parallel.

The discharge switching element 4 is connected in parallel to the primary winding N1 and the capacitor 3. The primary winding N1 is connected in series to the capacitor 3. In this embodiment, a discharge thyristor is used as the discharge switching element 4. The discharge thyristor 4 is not brought into a conduction state while the input electric power is supplied to the capacitor 3 via the charging circuit 1 and the capacitor 3 is charged. When the energy of the charged capacitor 3 is discharged, the discharge thyristor 4 is brought into the conduction state such that the path for the current to flow from the capacitor 3 to the primary winding N1 and the discharge thyristor 4 is formed. This capacitor discharge current flows to the secondary winding N2 and the welding electrodes 6A and 6B via the primary winding N1 to weld the object to be welded, which is clamped between the welding electrodes 6A and 6B.

The bypass switching element 5 is connected in parallel with the primary winding N1. In this embodiment, a bypass thyristor is used as the bypass switching element 5. When the bypass thyristor 5 is brought into the conduction state, the path from the charging circuit 1 via the bypass thyristor 5 to charge the capacitor 3 is established.

The control circuit 7 supplies control signals to the discharge thyristor 4 and the bypass thyristor 5. The control circuit 7 supplies an ON signal to the bypass thyristor 5 when the welding transformer 2 becomes a reset allowing state. The reset allowing state of the welding transformer 2 means, for example, that the bias magnetism of the welding transformer 2 does not proceed and the welding transformer 2 can operate in a stable manner even if a series of welding processes, including charging the capacitor 3, discharging the charged capacitor 3 and causing the welding current to flow, is continuously performed. After the capacitor 3 reaches a predetermined voltage value, the control circuit 7 supplies an ON signal to the discharge thyristor 4 if the welding current should flow to the welding transformer 2.

The detail manner of supplying the control signals will be described below when the operation is described.

Figure 2A:
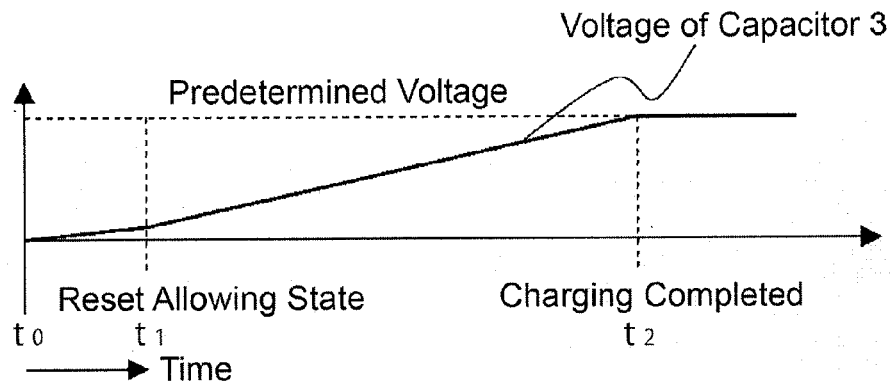
FIG. 2(a) is a voltage waveform diagram when the capacitive welder of the invention is charged.
Figure 2B:
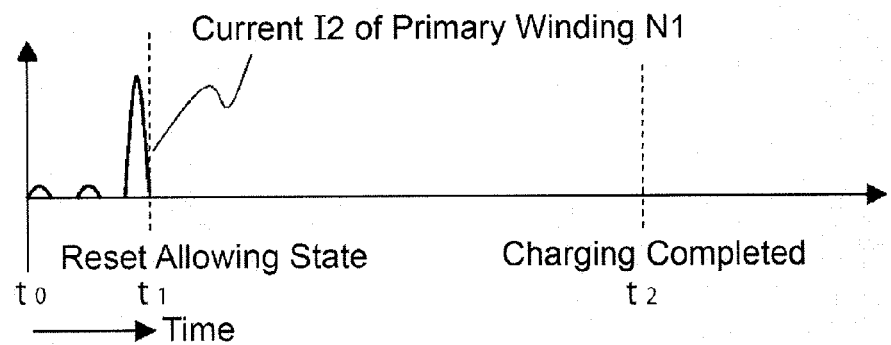
FIG. 2(b) is a current waveform diagram when the capacitive welder is charged.
Figure 2C:
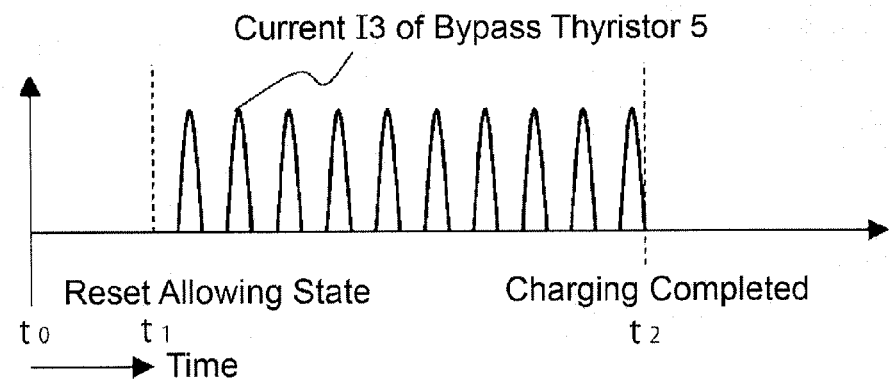
FIG. 2(c) is another current waveform diagram when the capacitive welder is charged.

Now, the operation will be described. FIGS. 2(*a*) to 2(*c*) are the waveform diagrams of the voltage and current during the charging process of the capacitive welder according to the embodiment of the invention. Specifically, FIG. 2(*a*) illustrates the voltage waveform of the capacitor 3, FIG. 2(*b*) illustrates the waveform of a current I2 flowing in the primary winding N1 of the welding transformer 2, and FIG. 2(*c*) illustrates the waveform of a current I3 flowing in the bypass thyristor 5.

Normally, the voltage of the capacitor 3 is zero at the time t0 in FIG. 2(*a*), which is prior to the charging. As the charging to the capacitor 3 starts at the time t0, the input electric power from the input terminals T1 are introduced to the charging circuit 1, and the charging current I1 flows toward the capacitor 3 from the charging circuit 1 in the direction indicated in FIG. 1. At this point in time, usually the discharge current from the capacitor 3 flowed in the welding transformer 2 during the previous welding process, the bias magnetism was generated during the previous welding process, and this bias magnetism is not yet eliminated. Thus, the welding transformer 2 is not yet in the reset allowing state. The control circuit 7, therefore, does not supply an on-signal to the bypass thyristor 5 at the beginning of the charging process, and maintains the bypass thyristor 5 in the off state.

The charging current I1 from the charging circuit 1 flows through the primary winding N1 of the welding transformer 2 in the direction, which is indicated by the current I2 in FIG. 1, and flows in the capacitor 3. Because the bypass thyristor 5 is not in the conduction state, the charging current I1 and the current I2 that flows in the primary winding N1 of the welding transformer 2 are the same. This current I2 serves as the reset current for the welding transformer 2. The current I2, in particular during the early time from its start of flowing, is used to reset the magnetism of the welding transformer 2, which has a very large inductance prior to the completion of the magnetism resetting, and therefore the magnitude of the current I2 is suppressed. Subsequently, as the magnetism resetting of the welding transformer 2 proceeds and that portion of the current I2 which is used to reset the magnetism of the welding transformer 2 decreases, then the current I2 that is greater than during the magnetism resetting flows as shown in FIG. 2(*b*), and the voltage build-up (increase) rate of the capacitor 3 increases. The voltage of the capacitor increases in proportion to the integrated value of the current flowing in the capacitor. It should be noted that because the discharge thyristor 4 and the bypass thyristor 5 are not brought into the conduction state between the time t0 and the time t1, the control circuit 7 does not supply an on-signal to the discharge thyristor 4 and the bypass thyristor 5 and maintains these thyristors 4 and 5 in the off state. Accordingly, the current I3 flowing in the bypass thyristor 5, which is shown in FIG. 2(*c*), is zero.

At the time t1 in FIGS. 2(*a*) to 2(*c*), the control circuit 7 supplies an ON signal to the bypass thyristor 5 and brings it into the conduction state as the welding transformer 2 enters the reset allowing state. Specifically, when the voltage of the capacitor 3 which is charged by the current flowing through the primary winding N1 becomes equal to or greater than a predetermined voltage value for reset determination, or when the current flowing through the primary winding N1 becomes equal to or greater than a predetermined current value for reset determination, for example, the control circuit 7 determines that the welding transformer 2 is in the reset allowing state. Alternatively, when the differential voltage between the voltage of the capacitor 3 and the previous voltage of the capacitor 3 becomes equal to or greater than the predetermined voltage value for reset determination or when the differential current between the current flowing through the primary winding N1 and the previous current flowing through the primary winding N1 becomes equal to or greater than the predetermined current value for reset determination, the control circuit 7 may determine that the welding transformer 2 is in the reset allowing state. In other words, a derivative (differential value) of the voltage or current may be used. Alternatively, the control circuit 7 may determine that the welding transformer 2 is in the reset allowing state when a predetermined time elapses since the current starts flowing through the primary winding N1. When the control circuit 7 determines that the welding transformer 2 is in the reset allowing state using any of the above-described approaches or other approaches, the control circuit 7 supplies an ON signal to the bypass switching element 5.

The determination of the reset allowing state of the welding transformer 2 will be described in detail. The determination of the reset allowing state of the welding transformer 2 may be made using the voltage across the opposite ends of the capacitor 3. A specific example of the voltage detecting unit for detecting the voltage across the opposite ends of the capacitor 3 may a voltage detecting unit including two resistors R1 and R2 (not shown) connected in series to each other, and the voltage detection unit may be connected in parallel to the capacitor 3. The voltage across the opposite ends of the capacitor 3 is applied to the opposite ends of the resistor R1 and the opposite ends of the resistor R2 in accordance with the impedance ratio of the resistor R1 to the resistor R2. The control circuit 7 determines whether the reset allowing state is reached or not, on the basis of whether the voltage value detected from the resistor R1 or R2 is, for example, no less than the predetermined voltage value for reset determination. In the early time of the flowing of the current I2 into the primary winding N1 from the charging start time t0 shown in FIG. 2(b), the current value of the current I2 flowing in the primary winding N1 is small and the voltage increasing (build up) rate of the capacitor 3 is small because of the magnetism resetting of the welding transformer 2. The predetermined voltage value for reset determination is set such that the detected voltage value during the above-mentioned early time of flowing of the current I2 is smaller than the predetermined voltage value for reset determination. As that part of the current I2 which is used for resetting the magnetism of the welding transformer 2, among the current I2 flowing in the primary winding N1, decreases, the current flowing in the capacitor 3 increases and therefore the voltage elevation of the charging voltage of the capacitor 3 increases. When the detected voltage value becomes equal to or greater than the predetermined voltage value for reset determination, the control circuit 7 determines that the welding transformer 2 is in the reset allowing state, and supplies an on-signal to the bypass thyristor 5.

The determination of the reset allowing state of the welding transformer 2 may be made using a current detecting unit. The current detecting unit may be any suitable unit as long as it detects the current flowing from the charging circuit 1 to the primary winding N1. Specifically, a common current detecting unit including, for example, a shunt resistor (not shown) or a photo-coupler (not shown) may be used to detect the value of the current flowing in a path from the charging circuit 1 to the capacitor 3 through the primary winding N1. It should be noted that the installation location of the current detecting unit such as the shunt resistor is not limited to a particular location as long as the current detecting unit is able to detect the current flowing in the above-mentioned path. The control circuit 7 may determine whether the reset allowing sate of the welding transformer 2 is reached or not, on the basis of whether the current value detected by the current detecting unit is no less than, for example, a predetermined current value for reset determination. As mentioned above, during the early time of the flowing of the current I2 into the primary winding N1 from the charging start time t0, the current value of the current I2 flowing through the primary winding N1 is small because of the magnetism resetting of the welding transformer 2. Thus, the predetermined current value for reset determination is set such that the detected current value is lower than the predetermined current value for reset determination. Upon resetting of the welding transformer 2, the current value of the current I2 flowing in the primary winding N1 increases, and therefore the detected current value becomes equal to or greater than the predetermined current value for reset determination. Then, the control circuit 7 determines that the welding transformer 2 is in the reset allowing state, and supplies an ON signal to the bypass thyristor 5.

Alternatively, for example, the voltage value of the capacitor 3 may be detected using the voltage detecting unit of the capacitor 3. The control circuit 7 may sample the detected voltage values at constant intervals to obtain the sampled values, and calculates the differential voltage value between the most recent sampled value and the previous sampled value. The control circuit 7 may determine whether the reset allowing state is reached or not, on the basis of whether the differential voltage value is no smaller than the predetermined voltage value for reset determination. Likewise, the current flowing in the primary winding N1 may be detected using, for example, the above-described current detecting unit. The control circuit 7 may sample the detected currents at constant intervals to obtain the sampled values, and calculates the differential current value between the most recent sampled value and the previous sampled value. The control circuit 7 may determine whether the reset allowing state is reached or not on the basis of whether the differential current value is no smaller than the predetermined current value for reset determination.

Alternatively, it is possible to make a determination on whether the welding transformer 2 is in the reset allowing state on the basis of whether a predetermined time elapses from the time t0. For example, a timer built in the control circuit 7 may count the time from the start of charging the capacitor 3 (time t0) to determine whether necessary time for resetting the welding transformer 2 elapses from the time t0. When the predetermined time elapses from the time t0, the control circuit 7 may determine that the welding transformer 2 is in the reset allowing state, and may supply an ON signal to the bypass thyristor 5.

When the bypass thyristor 5 is ready to enter a conduction state at the time t1, the bypass thyristor 5 is connected in parallel to the primary winding N1, and therefore the charging current I1 from the charging circuit 1 is divided to a path that flows to the capacitor 3 through the bypass thyristor 5 and another path that flows to the capacitor 3 through the primary winding N1 in accordance with the impedances of the bypass thyristor 5 and the primary winding N1. Because the primary winding N1 has a large inductance, the impedance of the primary winding N1 is greater than the impedance of the bypass thyristor 5. Accordingly, the current I1 from the charging circuit I1 flows mostly, as the current I3, through the bypass thyristor 5 having a lower impedance in the direction indicated by the arrow, and the current I2 hardly flows to the primary winding N1. Consequently, the capacitor 3 is charged by the current I3 flowing in the bypass thyristor 5. After the time t1, the current I3 flows in the bypass thyristor 5 as shown in FIG. 2(*c*), and the current I2 hardly flows in the primary winding N1 as shown in FIG. 2(*b*). The voltage of the capacitor 3 shown in FIG. 2(*a*) increases greater between the time t1 and the time t2 than between the time t0 and the time t1, in accordance with the current flowing in the capacitor 3. In other words, because the current does not flow through the primary winding N1 having the large inductance after the time t1, the charging current of the capacitor 3 increases and the charging speed of the capacitor 3 increases.

When the voltage of the capacity 3 reaches the predetermined voltage at the time t2 in FIG. 2(*a*), the charging of the capacitor 3 is completed. Because of this, the charging circuit 1 is electrically disconnected at the time t2. As described above, the charging circuit 1 has the switching element although the switching element is not shown. The switching element adjusts the input electric power to be supplied toward the capacitor 3 from the charging circuit 1. When the switching element in the charging circuit 1 is in the conduction state, normally the charging current I1 flows in the direction shown in FIG. 1. It should be noted that the reason why the current I2 flows intermittently in the primary winding N1 in the example shown in FIG. 2(*b*) and the current I3 flows intermittently in the bypass thyristor 5 in the example shown in FIG. 2(*c*) is because the charging current I1 is intermittently supplied toward the capacitor 3 by the turning on and off of the switching element in the charging circuit 1. If the input electric power from the input terminals T1 is a three-phase alternating current, the currents shown in FIGS. 2(*b*) and 2(*c*) may be the sum of three currents flowing between the respective phases.

Specifically, because the switching element in the charging circuit 1 is brought into the OFF state at the time t2, the charging circuit 1 is disconnected from the capacitor 3 side. Eventually the charging current I1 does not flow in the bypass switching element 5, and the bypass switching element 5 is turned off due to the natural arc-extinguishing when the current I3 flowing in the bypass switching element 5 decreases to, for example, approximately zero ampere.

Upon completing the charging at the time t2, the welding is then carried out with the discharging of the capacitor 3. The control circuit 7 supplies an ON signal to the discharge thyristor 4, and the discharge current flows from the capacitor 3, which is charged with the predetermined voltage shown in FIG. 2(*a*), into the primary winding N1 via the discharge thyristor 4 in the direction opposite the direction of the current I2 of FIG. 1. The discharge current flowing in the primary winding N1 causes the welding current to flow in the object to be welded, which is clamped between the welding electrodes 6A and 6B, via the secondary winding N2 thereby welding the object. The discharge thyristor 4 is turned off due to the natural arc-extinguishing, when the current flowing through the capacitor 3 and the primary winding N1 in the direction opposite the direction of the current I2 shown in FIG. 1 decreases to approximately zero ampere. Subsequently, when the welding finishes, the object to be welded which is clamped between the welding electrodes 6A and 6B is taken out, and one cycle of welding process finishes.

Because the control circuit 7 controls the timing of turning on and off of the switching element (not shown) in the charging circuit 1 by means of duty ratio control or frequency control, the input electric power to be introduced toward the capacitor 3 from the charging circuit 1 is controlled. Between the time t0, which is the start of the charging, and the time t1, which is the start of the reset allowing state, the charging current I1 flows in the primary winding N1 and the capacitor 3 from the charging circuit 1. In one exemplary charging process, the soft switching is performed at the start of the charging. Thus, the conduction time of the switching element (not shown) in the charging circuit 1, i.e., the on-time width, may be set to a minimum on-time width or the like before starting the charging process. Subsequently, in order to quickly complete the magnetism resetting of the welding transformer 2, the on-time width of the switching element in the charging circuit 1 is gradually expanded such that an amount of the input electric power to be introduced increases. It should be noted that the charging circuit 1 is normally controlled to operate with the constant current.

However, when the welding transformer 2 enters the reset allowing state and the bypass switching element 5 enters the conduction state, most of the charging current I1 flows in the capacitor 3 via the bypass thyristor 5 if the on-time width of the switching element in the charging circuit 1 is maintained at the same width as immediately before entering the reset allowing state, i.e., the on-time width of when the current flows in the primary winding N1 of the welding transformer 2 for magnetism resetting. If this occurs, a large current may flow instantaneously. This is because the charging current I1 that was hitherto flowing in the primary winding N1 having a large impedance flows now in the bypass thyristor 5 having a low impedance. If this large current flows suddenly (steeply), the bypass switching element may be damaged or broken.

To avoid this, when the current flows in the bypass switching element 5, the control circuit 7 brings the switching element (not shown) in the charging circuit 1 into the conduction state with the on-time width that is regulated not to cause an excessive current to flow in the bypass switching element 5 (e.g., with the minimum on-time width). Specifically, when the welding transformer 2 enters the reset allowing state and causes the current to start flowing from the charging circuit 1 through the bypass thyristor 5, the control circuit 7 controls the switching element (not shown) in the charging circuit 1 such that the switching element in the charging circuit 1 is maintained in the conduction state for the on-time width that is shorter than the maximum on-time width of when the current flows through the primary winding N1 of the welding transformer 2 before the switching element in the charging circuit 1 enters the reset allowing state.

For example, it should be assumed that when the thyristor is used as the switching element (not shown) in the charging circuit 1, the on-time width of the switching element of the charging circuit 1 becomes maximum upon entering the reset allowing state. In this case, when the welding transformer 2 enters the reset allowing state and causes the current to start flowing from the charging circuit 1 through the bypass thyristor 5, the control circuit 7 controls the switching element (not shown) in the charging circuit 1 such that the switching element in the charging circuit 1 is maintained in the conduction state for the on-time width shorter than the above-mentioned maximum on-time width. Alternatively, if an FET or other switching element, for example, is used as the switching element (not shown) in the charging circuit 1, then the FET is immediately turned off as the welding transformer enters the reset allowing state. It should be noted that if the on-time width does not become maximum while the welding transformer is in the reset allowing state, then the maximum on-time width which is reached beforehand is used as the reference. The control circuit 7 controls the switching element (not shown) in the charging circuit 1 such that the conduction state of the switching element is maintained for the on-time width shorter than this maximum on-time width when the control circuit 1 causes the current to start flowing through the bypass thyristor 5 from the charging circuit 1. This achieves the high speed charging of the capacitor 3, and prevents a large current from flowing when the bypass switching element 5 enters the conduction state.

In the above-described case, before the bypass switching element 5 is brought into the conduction state after the welding transformer 2 enters the reset allowing state, the ON signal may not be sent to the switching element (not shown) in the charging circuit 1 in order to avoid the feeding of the input electric power from the charging circuit 1. After that, in order to regulate the current flowing in the bypass switching element 5 as in the above-described case, the switching element (not shown) in the charging circuit 1 is again brought into the conduction state for the on-time width shorter than the maximum on-time width of when the current flows in the primary winding N1 of the welding transformer 2 before the welding transformer 2 enters the reset allowing state. Accordingly, the capacitor 3 is charged through the bypass switching element 5. This more reliably prevents a large current from flowing when the bypass switching element 5 enters the conduction state.

The configurations, structures, numbers, locations, shapes, materials and the like of the respective components and parts of the capacitive welder and the charging method for the capacitive welder according to the embodiment of the present invention are not limited to the above-described examples, and those which may be properly (suitably) selected and employed by a skilled person are also encompassed by the scope of the present invention. Specifically, although the semiconductor switch is represented by the symbol of the thyristor in the above-described embodiment, for example, the semiconductor switch is not limited to such particular electric element, and it is possible to configure the semiconductor switch in the form of an electric circuit that includes a single electric element having the same (similar) performance or function, or a plurality of electric elements having the same (similar) performance or function. All such modifications are encompassed by the scope of the present invention. Likewise, the structural details of the circuit, and the numbers, locations and the like of the respective circuit elements such as the diodes, the resistors and the switching elements may be properly modified or redesigned by a skilled person, and such modifications and redesigning are also encompassed by the scope of the present invention.

REFERENCE SIGNS LIST

T1: Input terminals; 1: Charging circuit; 2: Welding transformer; N1: Primary winding of the welding transformer 2; N2: Secondary winding of the welding transformer 2; 3: Capacitor; 4: Discharge thyristor (discharge switching element); 5: Bypass thyristor (bypass switching element); 6A, 6B: Welding electrodes; 7: Control circuit; I1: Charging current; I2: Current flowing in the primary winding N1 of the welding transformer 2; I3: Current flowing in the bypass thyristor (bypass switching element) 5.

The invention claimed is:

1. A capacitive welder comprising:
a charging circuit having a switching element;
a welding transformer having a primary winding and a secondary winding;
a capacitor to which an input electric power is introduced via the charging circuit;
a discharge switching element connected in parallel with the primary winding and the capacitor, the primary winding being connected in series to the capacitor;
a bypass switching element connected in parallel with the primary winding;
welding electrodes connected in parallel with the secondary winding of the welding transformer; and
a control circuit configured to bring the welding transformer into a reset allowing state by causing a reset current to flow in the primary winding using the input electric power introduced through the charging circuit without supplying an ON signal to the bypass switching element, and then supply the ON signal to the bypass switching element such that the capacitor is charged through the bypass switching element by the input electric power introduced through the charging circuit.

2. The capacitive welder according to claim 1, wherein when the welding transformer is brought into the reset allowing state and the current starts flowing in the bypass switching element from the charging circuit, the control circuit controls the switching element in the charging circuit such that the bypass switching element is brought into a conduction state with a shorter on-time width than a maximum on-time width of when the current flows in the primary winding of the welding transformer before the switching element of the charging circuit is brought into the reset allowing state.

3. The capacitive welder according to claim 2, wherein when a voltage of the capacitor that is charged with the current flowing through the primary winding becomes equal to or greater than a predetermined voltage for reset determination, when the current flowing through the primary winding becomes equal to or greater than a predetermined current for reset determination, when a differential voltage between the voltage of the capacitor and a previous voltage of the capacitor becomes equal to or greater than the predetermined voltage for reset determination, when a differential current between the current flowing through the primary winding and a previous current flowing through the primary winding is equal to or greater than the predetermined current for reset determination or when a predetermined time elapses since the current starts flowing through the primary winding, then the control circuit determines that the welding transformer is in the reset allowing state and supplies the on-signal to the bypass switching element.

4. The capacitive welder according to claim 1, wherein when a voltage of the capacitor that is charged with the current flowing through the primary winding becomes equal to or greater than a predetermined voltage for reset determination, when the current flowing through the primary winding becomes equal to or greater than a predetermined current for reset determination, when a differential voltage between the voltage of the capacitor and a previous voltage of the capacitor becomes equal to or greater than the predetermined voltage for reset determination, when a differential current between the current flowing through the primary winding and a previous current flowing through the primary winding is equal to or greater than the predetermined current for reset determination or when a predetermined time elapses since the current starts flowing through the primary winding, then the control circuit determines that the welding transformer is in the reset allowing state and supplies the ON signal to the bypass switching element.

5. The capacitive welder according to claim 1, wherein the discharge switching element includes a thyristor, and the bypass switching element includes a thyristor.

6. The capacitive welder according to claim 1, wherein bias magnetism does not proceed in the welding transformer during the reset allowing state, even if a welding process is carried out continuously.

7. The capacitive welder according to claim 1, wherein no current flows in the bypass switching element before the welding transformer is brought into the reset allowing state.

8. The capacitive welder according to claim 1, wherein the primary winding has a larger impedance than the bypass switching element.

9. A method of charging a capacitive welder, the capacitive welder including:
a charging circuit having a switching element;
a welding transformer having a primary winding and a secondary winding;
a capacitor to which an input electric power is introduced via the charging circuit;
a discharge switching element connected in parallel with the primary winding and the capacitor, the primary winding being connected in series to the capacitor;
a bypass switching element connected in parallel with the primary winding; and
welding electrodes connected in parallel with the secondary winding of the welding transformer,
the method comprising:
bringing the welding transformer into a reset allowing state by causing a reset current to flow into the primary winding using the input electric power introduced through the charging circuit without supplying an ON signal to the bypass switching element; and then supplying the ON signal to the bypass switching element such that the capacitor is charged through the bypass switching element by the input electric power introduced through the charging circuit.

10. The method according to claim 9, wherein when the welding transformer is brought into the reset allowing state and the current starts flowing in the bypass switching element from the charging circuit, the switching element in the charging circuit is controlled such that the bypass switching element is brought into a conduction state with a shorter on-time width than a maximum on-time width of when the current flows in the primary winding of the welding transformer before the switching element of the charging circuit is brought into the reset allowing state.

11. The method according to claim 10, wherein when a voltage of the capacitor that is charged with the current flowing through the primary winding becomes equal to or greater than a predetermined voltage for reset determination, when the current flowing through the primary winding becomes equal to or greater than a predetermined current for reset determination, when a differential voltage between the voltage of the capacitor and a previous voltage of the capacitor becomes equal to or greater than the predetermined voltage for reset determination, when a differential current between the current flowing through the primary winding and a previous current flowing through the primary winding is equal to or greater than the predetermined current for reset determination or when a predetermined time elapses since the current starts flowing through the primary winding, then it is determined that the welding transformer is in the reset allowing state and the on-signal is supplied to the bypass switching element.

12. The method according to claim 9, wherein when a voltage of the capacitor that is charged with the current flowing through the primary winding becomes equal to or greater than a predetermined voltage for reset determination, when the current flowing through the primary winding becomes equal to or greater than a predetermined current for reset determination, when a differential voltage between the voltage of the capacitor and a previous voltage of the capacitor becomes equal to or greater than the predetermined voltage for reset determination, when a differential current between the current flowing through the primary winding and a previous current flowing through the primary winding is equal to or greater than the predetermined current for reset determination or when a predetermined time elapses since the current starts flowing through the primary winding, then it is determined that the welding transformer is in the reset allowing state and the on-signal is supplied to the bypass switching element.

13. The method according to claim 9, wherein bias magnetism does not proceed in the welding transformer during the reset allowing state, even if a welding process is carried out continuously.

14. The method according to claim 9, wherein no current flows in the bypass switching element before the welding transformer is brought into the reset allowing state.

15. The method according to claim 9, wherein the primary winding has a larger impedance than the bypass switching element.

* * * * *